United States Patent Office 2,729,559
Patented Jan. 3, 1956

---

2,729,559

METHOD OF MANUFACTURING ELECTRIC CONTACT MATERIAL

Tatsuo Matsukawa, Asahi-ku, Osaka-shi, Japan

No Drawing. Application August 1, 1952,
Serial No. 302,248

1 Claim. (Cl. 75—201)

---

Electric contact materials composed of silver and graphite are made by the powder metallurgical process and have such advantages as less cohesion. Furthermore, such electric contact materials have less increase in electrical resistance as they are used. On the other hand, such materials have certain defects such as less uniformity in their structure, low hardness and higher consumption because of the great difference in specific gravity between silver and graphite and due to the fact that silver and graphite are not soluble in each other.

In the present invention, there is disclosed a method of obtaining contact materials which has a uniform structure and increased hardness, as well as less consumption and less contact resistance in use.

The electric contact material is made with copper-silver-alloy-coated graphite powder. This powder is produced by heating at 300 to 650 degrees centigrade in a reducing atmosphere after coating the graphite not with silver alone, but with two or more alternate layers of silver and copper. Then, the coated powder is molded under pressure and sintered at 650 to 800 degrees centigrade in a reducing atmosphere.

When coating with two layers, the graphite powder is covered by copper directly and coated with silver, or is coated with these materials in the reverse order. In using three or more layers or coatings, silver or copper is again deposited alternately thereon.

During the heating at 300 to 650 degrees centigrade and sintering at 650 to 800 degrees centigrade, as previously described, the two or more layers of silver and copper dissolve uniformly together into silver-copper alloy.

The reason for applying the silver-copper alloy to the coating of the graphite powder is because silver is soluble in copper up to 8.2 per cent and copper is 8.8 per cent soluble in silver and such alloys increase the hardness much higher than the pure elements.

To coat the graphite or silver-coated graphite powder with copper, applicant has previously provided a method of copper coating by agitating these powders with zinc or iron powders together in an aqueous solution of cupric salts.

When the amount of silver in the aqueous solution of silver nitrate is less than the chemical equivalent of copper, the excess of copper remains on the graphite powder and the silver substituted for the copper coats on it, and then the two layers of silver and copper are formed on the surface of graphite.

Coating of the third or additional layers is performed by repeating the process as previously described.

The silver-copper-alloy-coated graphite powder produced by the wet coating process above described is washed with water and heated at 300 to 650 degrees centigrade in the reducing atmosphere. By this heating the copper oxide on the surface is reduced and the diffusion reaction is partially performed.

Then the powder is pressed in the mold under the pressure of 2 to 8 tons per cm.$^2$ into the desired form, and finally sintered in the reducing atmosphere at 650 to 800 degrees centigrade. The product is applied to the materials of electrical contacts.

A few examples of practical applications are shown as follows:

(1) 3,000 litres of aqueous solution of silver nitrate (containing 0.03 g. of silver in each cm.$^3$) is added to the 36.5 g. of copper coated graphite powder whose composition is 86.3% copper and 13.7% graphite, and agitated. Then the product is washed with water and dried. After heating the powder 2 hours at 500 degrees centigrade in the hydrogen flow, the silver-copper-alloy-coated graphite powder composed of 5% graphite, 5% copper and 90% silver is produced. Press the powder in the mold under the pressure of 3 tons per cm.$^2$, and sinter at 700 degrees centigrade 2 hours in the hydrogenous atmosphere.

(2) The mixture of 97 g. of silver-coated graphite powder whose composition is 94.8% of silver and 5.2% of graphite and 3 g. of zinc powder is added with 60 cc. of aqueous solution of copper sulphate (containing 0.05 g. of copper in each cm.$^3$), and stirred. After washing with water and drying, the product is heated 2 hours at 500 degrees centigrade in the hydrogen flow, and the silver-copper-alloy-coated graphite powder consisting of 5% of graphite, 3% of copper and 92% of silver is produced. Mould the powder under the pressure of 3 tons per cm.$^2$ and sinter it for 2 hours at 700 degrees centigrade in the hydrogenous atmosphere.

Electric contact material prepared out of silver-copper-alloy-coated graphite powder (B), specified in this invention, is compared with that of silver-coated graphite powder (A) with respect to the hardness and consumption in their operation as follows:

| Marks | Composition (percent) | | | Hardness (Vickers) | Consumption (Grams) |
|---|---|---|---|---|---|
| | Silver | Copper | Graphite | | |
| A | 93 | | 7 | 23 | 0.450 |
| B | 90 | 3 | 7 | 45 | 0.013 |

For the consumption test an NF-100 type Deion air circuit breaker is employed. The contact plate which is made of material whose dimensions are 13 mm. square in contact area and 2 mm. in thickness is set on the fixed side of the contact, and silver-nickel alloy contact on the movable side.

The potential difference between contacts is 250 volts A. C. and amperage in the circuit is 100 amp. Cycles of contact operation are 18 times on with a break in each minute.

The "consumption" shown in the table is the weight decrease in the contact on the fixed side after 6,000 times breaking.

While one illustrative embodiment of the invention has been described in detail, it is not my intention to limit its scope to that embodiment or otherwise than by the terms of the appended claim.

Having now described my invention, what I claim as new and desire to secure by Letters Patent is:

The method of making electric contact material, comprising the steps of adding to 3000 liters of aqueous solution of silver nitrate which contains .03 gram of silver in each cc., 36.5 grams of copper coated graphite powder whose composition is 86.3% copper and 13.7% graphite by weight, and then agitating the mixture, then washing the material with water and drying the material, next heating the powder for two hours at 500° C. in a hydrogen flow to produce a silver-copper-alloy coated graphite powder composed of 5% graphite, 5% copper, and 90% silver by weight, then pressing the powder in a mold with a pressure of 3 tons per square centimeter, and sintering at 700° C. for two hours in the hydrogenous atmosphere.

References Cited in the file of this patent

UNITED STATES PATENTS

| | | |
|---|---|---|
| 927,935 | Bolton | July 13, 1909 |
| 1,833,099 | Welch | Nov. 24, 1931 |
| 1,986,197 | Harshaw | Jan. 1, 1935 |
| 2,273,832 | Carney | Feb. 24, 1942 |
| 2,358,326 | Hensel et al. | Sept. 19, 1944 |